United States Patent
Stoev et al.

(10) Patent No.: US 7,292,409 B1
(45) Date of Patent: Nov. 6, 2007

(54) MAGNETIC HEAD WITH THIN TRAILING PEDESTAL LAYER

(75) Inventors: Kroum S. Stoev, Fremont, CA (US); Francis H. Liu, Fremont, CA (US); James H. Wang, Mission Viejo, CA (US); Marcos M. Lederman, San Francisco, CA (US); David J. Seagle, Morgan Hill, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 400 days.

(21) Appl. No.: 10/788,766

(22) Filed: Feb. 27, 2004

(51) Int. Cl.
  *G11B 5/147* (2006.01)
  *G11B 5/17* (2006.01)
  *G11B 5/187* (2006.01)
(52) U.S. Cl. .................................................... 360/126
(58) Field of Classification Search ................. 360/126
  See application file for complete search history.

(56) References Cited

U.S. PATENT DOCUMENTS

| | | | | |
|---|---|---|---|---|
| 6,459,543 B1 * | 10/2002 | Sasaki | ........................ | 360/126 |
| 6,583,954 B1 * | 6/2003 | Sasaki | ........................ | 360/126 |
| 6,778,354 B2 * | 8/2004 | Matono | ........................ | 360/123 |
| 2003/0179497 A1 * | 9/2003 | Harris et al. | ................. | 360/126 |
| 2004/0037002 A1 * | 2/2004 | Kudo et al. | .................. | 360/126 |
| 2004/0196590 A1 * | 10/2004 | Sasaki et al. | ................ | 360/126 |
| 2005/0180048 A1 * | 8/2005 | MacDonald et al. | ......... | 360/125 |

OTHER PUBLICATIONS

Honda et al, "1.5 Gbit/in$_A$2 Perpendicular Recording with Inductive Head", IEEE Transactions on Magnetics, v. 33, No. 5, pp. 3097-3099, Sep. 1997.*

* cited by examiner

*Primary Examiner*—Julie Anne Watko
(74) *Attorney, Agent, or Firm*—Strategic Patent Group

(57) ABSTRACT

A magnetic head for a disk drive is disclosed that has a first soft magnetic pole layer disposed in the head adjacent to a medium-facing surface and extending perpendicular to the medium-facing surface; a second soft magnetic pole layer disposed closer than the first pole layer to the trailing end, the second pole layer magnetically coupled to the first pole layer in a backgap region; a soft magnetic pedestal adjoining the second pole layer, disposed closer than the second pole layer to the medium-facing surface and extending less than the second pole layer extends from the medium-facing surface, the pedestal separated from the first pole layer by a nonferromagnetic gap, the pedestal having a thickness that is less than four hundred and fifty nanometers between the gap and the second pole layer. Longitudinal and perpendicular recording embodiments are disclosed, as well as solenoidal, single-layer and dual-layer reversed-current coil structures.

38 Claims, 5 Drawing Sheets

MAGNETIC HEAD WITH THIN TRAILING PEDESTAL LAYER

BACKGROUND

The present invention relates to inductive magnetic transducers, which may for example be employed in information storage systems or measurement and testing systems.

Inductive heads used for writing and/or reading magnetic information on storage media such as a disk or tape typically include electrically conductive coil windings encircled by a magnetic core including first and second pole layers. Portions of the pole layers adjacent the media are termed pole tips. The magnetic core is interrupted by a submicron nonmagnetic gap disposed between the pole tips to divert magnetic flux to the media during writing. To write to the media electric current is flowed through the coil, which produces magnetic flux in the core encircling the coil windings, the magnetic flux fringing across the nonmagnetic gap adjacent to the media so as to write bits of magnetic field information in tracks on the media.

The first pole layer may also serve as a magnetic shield layer for a magnetoresistive (MR) sensor that has been formed prior to the pole layers, the combined MR and inductive transducers termed a merged or piggyback head. Typically the first pole layer is substantially flat and the second pole layer is curved, as a part of the second pole layer is formed over the coil windings and insulation disposed between the pole layers, while another part nearly adjoins the first pole layer adjacent the gap. The second pole layer may also diverge from a flat plane by curving to meet the first pole layer in a region distal to the media-facing surface, sometimes termed the back gap region, although typically a nonmagnetic gap in the core does not exist at this location.

The distance from the media-facing surface to where the first and second pole layers begin to diverge and become separated by more than the submicron nonmagnetic gap may be termed the throat height. Because less magnetic flux crosses the gap as the pole layers are further separated, a short throat height is desirable in obtaining a fringing field for writing to the media that is a significant fraction of the total flux crossing the gap.

In addition to the second pole layer being curved from planar, one or both pole layers may also have a tapered width in the pole tip area, to funnel flux through the pole tips. A place where the second pole layer begins to widen is sometimes termed a nose or flare point. The distance to the flare point from the media-facing surface, sometimes called the nose length, also affects the magnitude of the magnetic field produced to write information on the recording medium, due to decay of the magnetic flux as it travels down the length of the narrow second pole tip. Thus, shortening the distance of the flare point from the media-facing surface would also increase the flux reaching the recording media.

Unfortunately, the aforementioned design parameters require a tradeoff in the fabrication of the second pole tip. The second pole tip should be narrow and well-defined in order to produce narrow and well-defined written tracks on the rotating disk, but the slope of the second pole layer at the end of the throat height makes photolithography difficult. The second pole layer can be formed in two pieces to better define the pole tip; a flat pole tip layer and a curved yoke layer that are connected or stitched together. This solution, however, can actually require the throat height to be extended in order to have a sufficient stitched area for flux transfer between the second pole tip and the yoke. High-resolution photolithography, such as I-line or deep ultra violet (DUV) photolithography, may be useful for reducing feature sizes but has a more limited depth of focus that may exacerbate the problem of focusing on the sloped pole layer adjacent the throat.

In addition, several methods are known to form self-aligned pole tips. In one method, an ion beam etch (IBE) or other highly anisotropic process removes a portion of the second pole layer not protected by a mask, thereby creating the second pole tip, with the etching continued to similarly remove a portion of the first pole tip not covered by the second pole tip. The width of the pole tip layers are therefore matched, and walls of the pole tips are aligned, but the problem of accurately defining the second pole tip by photolithography for a short throat height remains.

High-frequency operation may also be counteracted by self-inductance of the coil that is used to drive the magnetic flux. The number of coil turns may be reduced to reduce the self-inductance, but this generally results in reduced electromotive force. Larger coil cross-sections may be employed, but at high frequencies a skin effect may arise that limits electric current to the surface of the coil cross-sections. Other coil configurations can be employed but typically involve manufacturing difficulties.

SUMMARY

A magnetic head for writing information on a relatively-moving medium is disclosed that has a first soft magnetic pole layer disposed in the head adjacent to the medium-facing surface and extending substantially perpendicular to the medium-facing surface; a second soft magnetic pole layer disposed closer than the first pole layer to the trailing end, the second pole layer magnetically coupled to the first pole layer in a backgap region that is removed from the medium-facing surface; a soft magnetic pedestal adjoining the second pole layer, the pedestal disposed closer than the second pole layer to the medium-facing surface and extending less than the second pole layer extends from the medium-facing surface, the pedestal separated from the first pole layer by a nonferromagnetic gap, the pedestal having a thickness that is less than four hundred and fifty nanometers between the gap and the second pole layer; and a conductive section that is disposed between and electrically isolated from the first and second pole layers.

In one embodiment, a single layer coil encircles the backgap region. In another embodiment, a coil encircles the backgap region in a first layer, and a second coil layer is disposed between the second pole layer and the trailing end, so that a current traveling clockwise in the first coil layer travels counterclockwise in the second coil layer. In another embodiment, a coil encircles the second pole layer, the coil including a plurality of substantially parallel, electrically conductive sections disposed in a layer that is located between the first and second pole layers, each of the conductive sections having a length measured in a direction that is substantially parallel to the medium-facing surface, wherein the length of at least two of the conductive sections is different.

DETAILED DESCRIPTION OF THE PREFERRED EMBODIMENT

Figure 1:
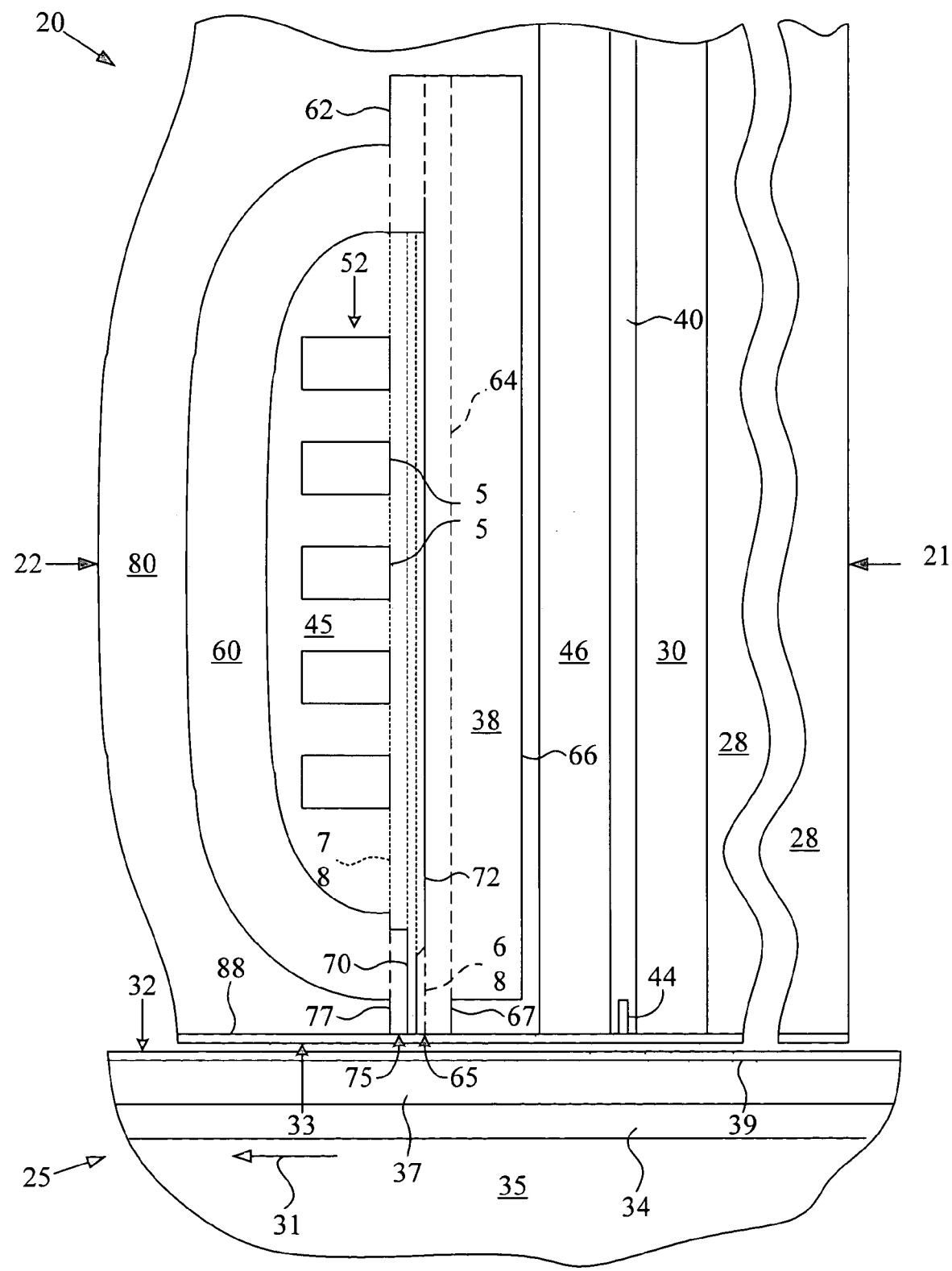
FIG. 1 is a cutaway cross-sectional view of a magnetic head in proximity to a relatively moving medium such as a rigid disk.

FIG. 1 is a cutaway cross-sectional view of a magnetic head 20 in proximity to a relatively moving medium 25 such as a rigid disk. The medium 25 includes a substrate 35 over which a seed or texture layer 34 may have optionally been formed, followed by a media layer 37. The media layer 37 may have an easy axis of magnetization that is substantially parallel to a major surface 32 of the medium. Although depicted as a single layer, media layer 37 may be formed of a plurality of layers. A thin, physically hard overcoat 39 separates the media layer 37 from the medium surface 32. The medium 35, which may for example be a rigid disk, is moving relative to the head in a direction shown by arrow 31. The head 20 may be spaced from the medium 25 by a nanoscale air bearing, or the head may be in frequent or continuous contact with the medium during operation. The word nanoscale as used herein is meant to represent a size that is most conveniently described in terms of nanometers, e.g., between about one nanometer and about two hundred nanometers.

The head 20 has a leading end 21, a trailing end 22 and a medium-facing surface 33. A first pole layer 66 is disposed in the head and terminates adjacent to the medium-facing surface 33. Layer 66 is preferably made of low coercivity, high permeability material, which is sometimes called "soft magnetic" material. A first portion 38 of the first pole layer 66 is disposed further than a second portion 67 of the first pole layer from the medium-facing surface 33, the second portion 67 forming a first pole tip 65. The second portion 67 includes a yoke layer 64 and a throat layer 68. The throat layer 68 adjoins a nanoscale, electrically insulating, nonferromagnetic gap layer 70, the throat layer 68 tapering away from the gap layer at a throat height from the medium-facing surface 33, replaced with an electrically insulating, nonferromagnetic layer 72. At least the throat layer 68 is made of a high magnetic moment material, e.g., having a magnetic saturation of at least twenty kiloGauss, and the remainder of second portion 67 or pole layer 66 may also be made of high magnetic saturation materials.

The throat layer 68 may be formed by sputtering or otherwise depositing a layer of ferromagnetic material, after which a mask is formed to protect the throat layer 68 while the reminder of the deposited ferromagnetic layer is removed, for example by ion beam etching (IBE), also known as milling. Electrically insulating, nonferromagnetic material such as alumina is then deposited atop the mask as well as adjacent to the throat layer 68 to form layer 72. The mask is removed by an agitated chemical lift-off process, leaving layer 72 aligned with layer 68. Throat layer 68 may be polished before or after the formation of layer 72.

A second soft magnetic pole layer 60 adjoins a soft magnetic pedestal 77 that terminates adjacent to the medium-facing surface 33 in a second pole tip 75. Pedestal 77 preferably includes vapor-deposited high magnetic saturation materials, and is aligned with electrically insulating, nonferromagnetic layer 78. Ferromagnetic pedestal 77 and electrically insulating, nonferromagnetic layer 78 may be formed by mill-and-fill techniques similar to that described above with reference to layers 68 and 72. The second pole layer 60 is magnetically coupled to the first pole layer 108 by a soft magnetic backgap structure 62 in a core region that is removed from the medium-facing surface 33. The pedestal 77 can be trimmed by a highly anisotropic removal process such as ion beam etching (IBE) to a desired track width. Such etching can remove part of the second portion 67 of the first pole layer 66 that is not masked by the pedestal, aligning the first and second pole tips at a submicron track width.

A single electrically conductive coil layer 52 spirals around the backgap structure 62 and includes a plurality of coil sections 55 that are disposed between the soft magnetic layers 60 and 66. A current flowing in coil sections 105 induces magnetic flux in the magnetic elements 60, 62, 67, and 77, which fringes out from the pole tips 65 and 75 adjacent to the gap layer 70 to write a magnetic pattern on the media layer 37. The single coil layer 52 is filled with photoresist 45 in regions between the coil sections 55.

Because layers 70, 72 and 78 separate coil sections 55 from first pole layer 66, pedestal 77 can have a reduced thickness, for example, of less than one-half micron. Such a reduced thickness of the pedestal 77 affords more precise tailoring of the track-width during trimming of the pedestal and throat layer 68.

The head 20 also includes a magnetoresistive (MR) sensor 44 sandwiched between first and second soft magnetic shield layers 30 and 46. The MR sensor 44 can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. Other magnetic sensors, such as optical sensors, can alternatively be employed to sense magnetic fields from the medium. A non-magnetic, electrically insulating material 40 is disposed between shields 30 and 46 and around sensor 44. A thin hard coating 88 formed for example of diamond-like carbon (DLC), silicon carbide (SiC), tetrahedral amorphous carbon (ta-C) or the like protects the MR sensor 44 from corrosion or other damage, the coating forming at least part of the medium-facing surface 33.

The MR sensor 44 is disposed adjacent to a substrate 28 on which the aforementioned thin film layers of the head 100 have been formed. The substrate 28 may extend much further between the first shield 30 and the leading end 21 than the distance between the first shield and the trailing end 22, and may be formed of any appropriate substrate material known in the art of magnetic heads, such as alumina, silicon, alumina-titanium-carbide, ferrite, etc.

Figure 2:
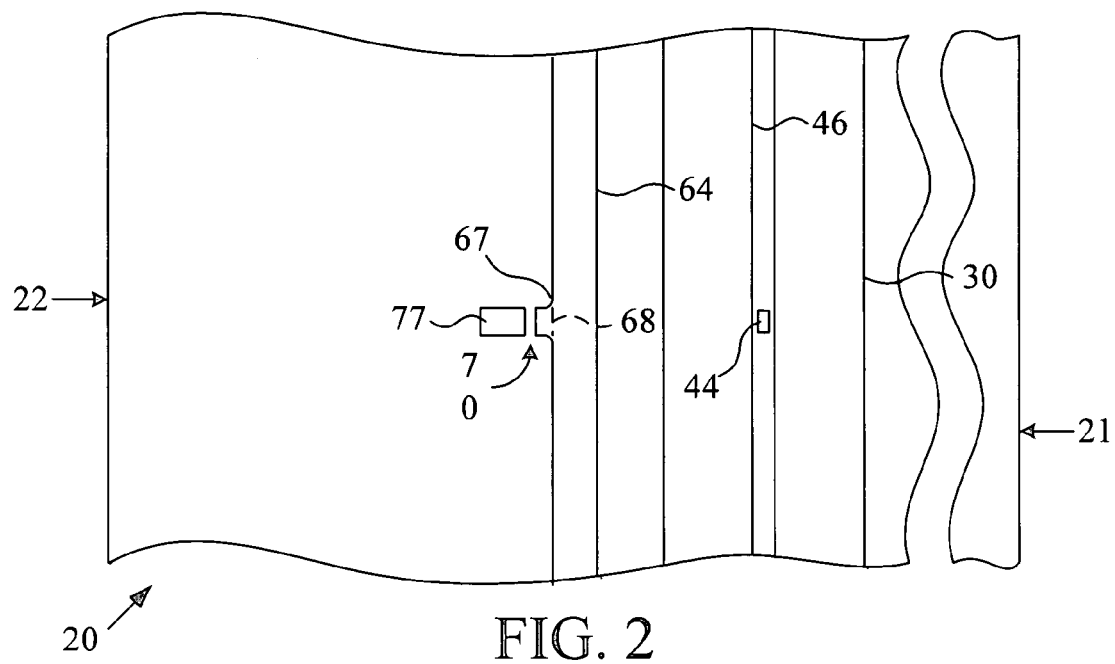
FIG. 2 is a cutaway view of the head of FIG. 1 as seen from the medium.

FIG. 2 is a cutaway view of the head 20 of FIG. 1 as seen from the medium, looking through the thin transparent coating 88 of the medium-facing surface 33, which is therefore not evident in this figure. In this embodiment, pedestal 77 and layer 68 have been trimmed for example by ion beam etching (IBE), aligning those layers and defining the track width of nonferromagnetic gap 77. Second pole layer 60 and layer 38 of the first pole do not extend as close to the medium facing surface and so are not shown in this figure. The reduced thickness of pedestal 77, which may for example have a thickness in a range between 450 nanometers and 100 nanometers after trimming, increases the accuracy with which that pedestal can be trimmed, providing the possibility of a narrower track-width. In a high-density embodiment, pedestal 77 may have a track-width that is less than 100 nanometers, and a similar thickness.

Figure 3:
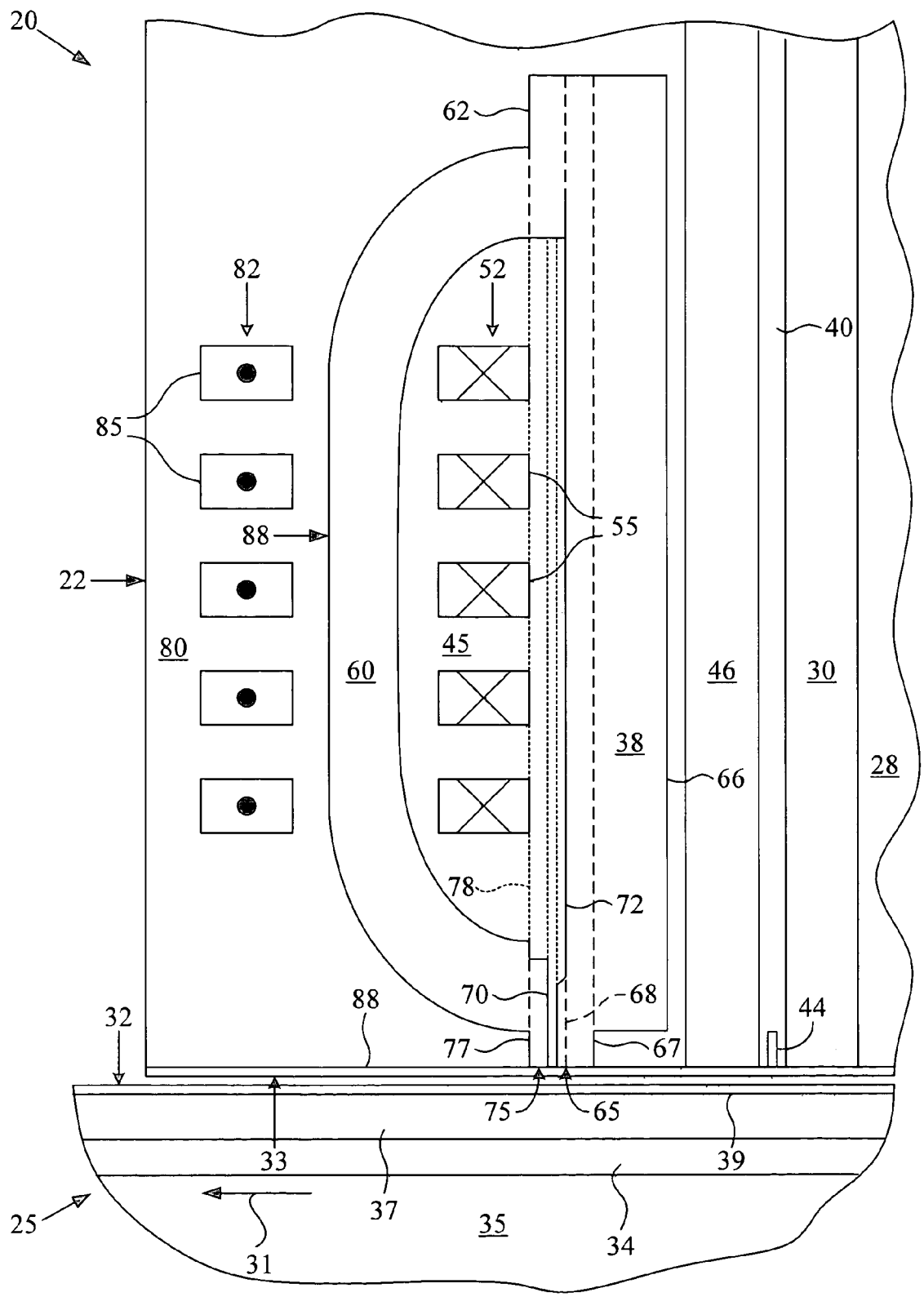
FIG. 3 is a cutaway cross-sectional view of another head in proximity to the moving medium, the head including a trailing pole layer enveloped by two coil layers.

FIG. 3 is a cutaway cross-sectional view of a magnetic head 20 and medium 25 that are similar to that shown in FIG. 1, but the head of FIG. 3 has a second coil layer 82 including coil sections 85 that are located between the second pole layer 60 and the trailing end 22. Current in coil sections 85 flows in a substantially opposite direction to that flowing in coil section 55. For example, current in coil sections 85 is depicted in FIG. 3 as flowing out of the page, while that flowing in coil section 55 is depicted as flowing into the page.

A trailing edge 88 of second pole layer 60 has been flattened by polishing such as chemical-mechanical polishing (CMP) prior to the formation of second coil layer 82. The flat midsection of trailing edge 88 is in contrast to the curved profile of the leading edge of that pole layer 60. Electrically insulating, nonferromagnetic material 80 covers the second coil layer 82.

In one embodiment, each section 55 of coil layer 52 may be connected with an adjacent section 85 of coil layer 82, to form a solenoidal coil that encircles a second pole layer 60. In another embodiment, coil layer 52 may spiral around an axis that is substantially aligned with backgap structure 62, and coil layer 82 may spiral around a similar axis, so that current flowing clockwise in coil layer 52 flows counter-clockwise in coil layer 82. This structure may be termed a dual-layer reversed-current coil.

Figure 4:
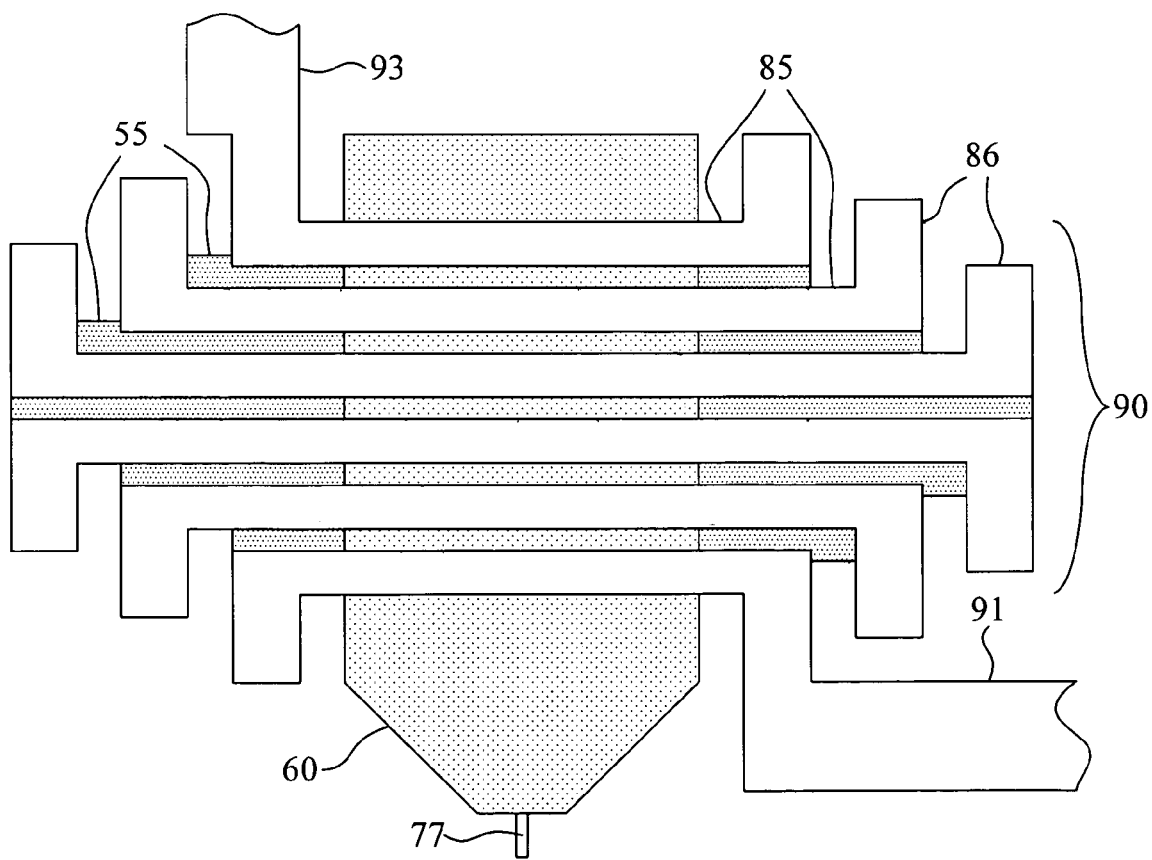
FIG. 4 is a view of the head of a solenoidal coil embodiment of FIG. 3 as would be seen looking at the trailing end and focusing on some active elements.

FIG. 4, which is a view of the head 20 as would be seen looking at the trailing end 22 and focusing on some of the active elements of the write transducer, illustrates an example of a coil structure that may be employed for the solenoidal coil embodiment. The electrically conductive coil 90 winds around the second pole layer 60 to connect conductive sections 85 with conductive sections 55. Leads 91 and 93 extend off the page to connect with bond pads that are located on the trailing or top surface of the head to receive signals from drive electronics. Conductive sections 55 extend different amounts in the track-width direction, and conductive sections 85 extend different amounts in the track-width direction. The conductive sections 85 are disposed in a layer and have an end portion 86 that extends within the layer transversely to the remainder of that section, and the conductive sections 215 have a similar transversely extending end portion, not shown in this figure. The transversely extending end portions afford greater areas for interconnection between the conductive sections 55 and 85, and the differing lengths of the conductive sections 55 and 85 provide room for the end portions.

Current flowing into lead 91 and out of lead 93 flows right-to-left in coil sections 85 and left-to-right in coil sections 55, inducing magnetic flux to flow downward in pole layer 60 and pedestal 77, fringing out from gap 70 to write an image on media layer 37. Current flowing into lead 93 and out of lead 91 flows left-to-right in coil sections 85 and right-to-left in coil sections 55, inducing magnetic flux to flow upward in pole layer 60 and pedestal 77, and write an oppositely magnetized image on media layer 37.

Figure 5:
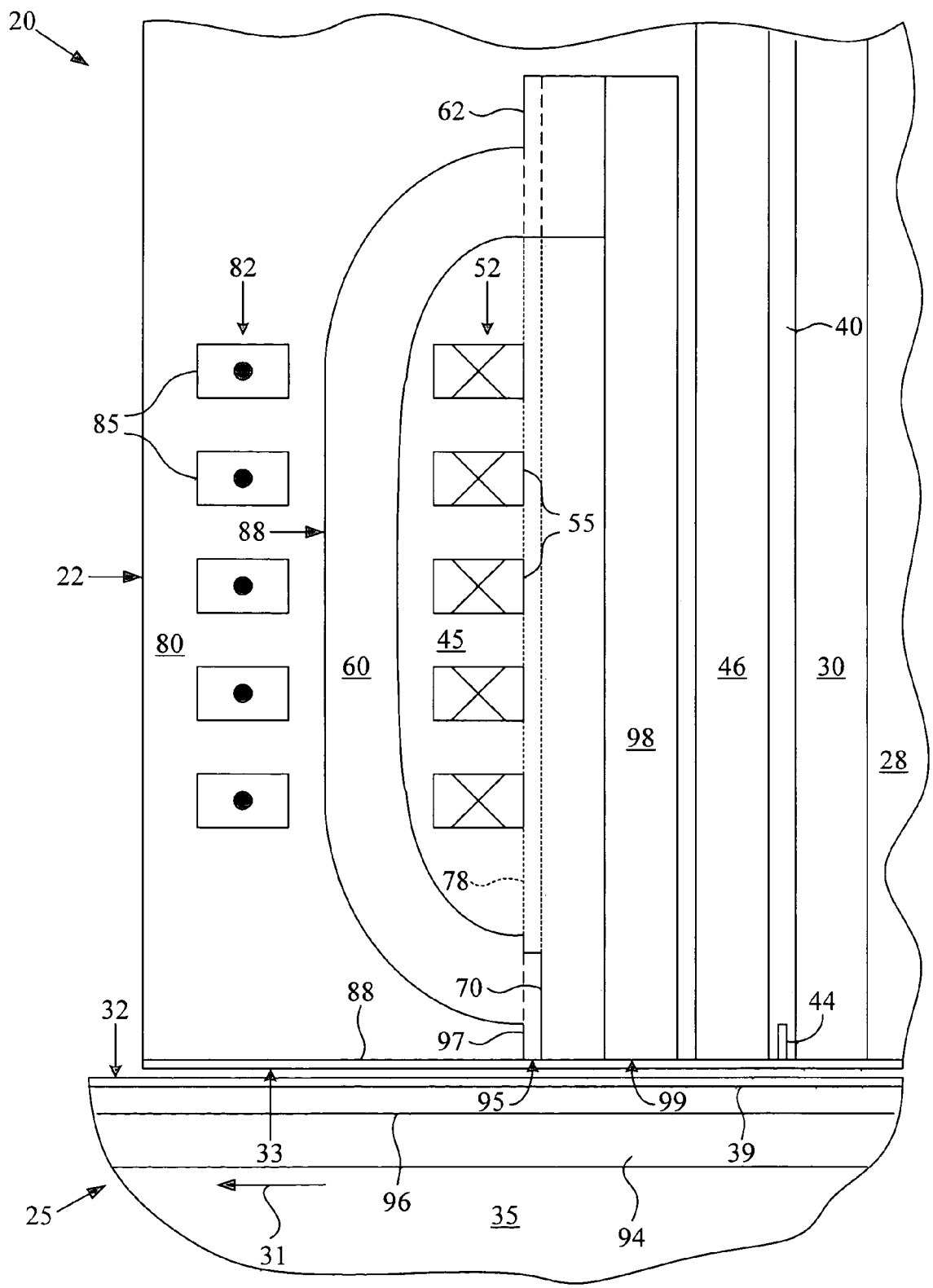
FIG. 5 is a cutaway cross-sectional view of another head in proximity to a moving medium, the head and medium modified for perpendicular recording.

FIG. 5 shows an embodiment of the head 20 that is designed for perpendicular recording on the medium 25. The medium 25 in this embodiment has a soft magnetic underlayer 94 and a media layer 96 that has an easy axis of magnetization that is perpendicular to the medium surface 32. Either or both of the underlayer 94 and the medium layer 96 may be formed of plural layers.

The head 20 has a recording pole layer 97 that terminates in a recording pole tip 95 and a return pole layer that terminates in a return pole tip 99. The return pole tip 99 has an area adjoining the medium-facing surface 33 that is at least two orders of magnitude greater than that of the recording pole tip 95. The pole tips 95 and 99 are also separated from each other by more than the distance between either pole tip and the soft magnetic underlayer 94 of the medium. The recording pole tip 95 may have a trapezoidal shape, and the recording pole layer 97 may have a matching trapezoidal cross-section at a distance of at least one micron from the pole tip 95, with the trailing edge of the tip being larger than the leading edge to reduce side writing. Having the larger trailing edge adjoin the second pole layer 60 also helps to couple magnetic flux between pole layer 60 and the much smaller recording pole layer 97. Alternatively, the thickness of the recording pole layer 97, measured in a direction between the leading end and the trailing end, may be less than the track-width of that layer 95.

Figure 6:
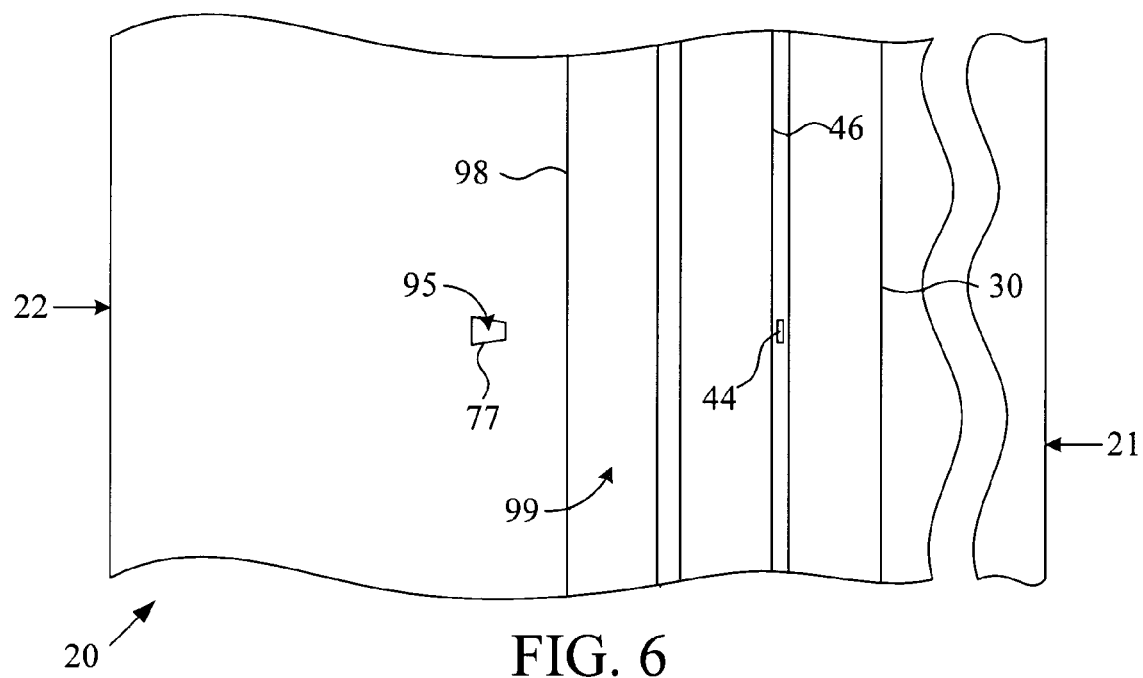
FIG. 6 is a cutaway view of the head of FIG. 5 as seen from the medium.

FIG. 6 is a cutaway view of the head 20 of FIG. 1 as seen from the medium, looking through the thin transparent coating 88 of the medium-facing surface 33, which is therefore not evident in this figure. In this embodiment, pedestal layer 77 has been formed with a trapezoidal shape with the trailing edge polished to define the track width of the recording pole tip 95. In this view, the dramatically different size of the write pole tip 95 compared to the return pole tip 99 is apparent. For near term disk drives having areal densities of greater than one gigabit per square inch, the track width may range between about 200 nanometers and 50 nanometers or less, and the track length may range between about 250 nanometers and 80 nanometers or less. A track-width dimension of the trapezoidal pole 95 may, for example, have a trailing edge track-width of 0.15 micron (150 nanometers) or less, and a track-length dimension of approximately 0.25 micron (250 nanometers) or less. The medium-facing area of write pole tip 95 is therefore less than 0.04 square microns (40,000 square nanometers). Return pole tip 99 may measure on the order of 1.0 micron in the track-length dimension, and may extend 10 to 100 microns in the track-width dimension, large enough that its full width is not shown in this cutaway drawing. The medium-facing area of return pole tip 99 is therefore at least two or more orders of magnitude greater than that of the write pole tip 95.

The invention claimed is:

1. A magnetic head for writing information on a relatively-moving medium, the head having a leading end, a trailing end and a medium-facing surface, the head comprising:
   a first soft magnetic pole layer disposed in the head adjacent to the medium-facing surface and extending substantially perpendicular to the medium-facing surface;
   a second soft magnetic pole layer disposed closer than the first soft magnetic pole layer to the trailing end, the second soft magnetic pole layer magnetically coupled to the first soft magnetic pole layer in a backgap region that is removed from the medium-facing surface;
   a soft magnetic pedestal adjoining the second pole layer, the soft magnetic pedestal disposed closer than the second soft magnetic pole layer to the medium-facing surface and extending less than the second soft magnetic pole layer extends from the medium-facing surface, the soft magnetic pedestal separated from the first soft magnetic pole layer by a nonferromagnetic gap, the soft magnetic pedestal having a thickness that is less than four hundred and fifty nanometers between the nonferromagnetic gap and the second soft magnetic pole layer; and a conductive section that is disposed between and electrically isolated from the first and second soft magnetic pole layers, the conductive section being part of a coil; and wherein the magnetic head has at least one set of characteristics selected from a group consisting of the following sets of characteristics:
(a) the conductive section is ferromagnetic and the coil substantially encircles the second soft magnetic pole layer;
(b) the coil includes a first plurality of conductive sections that are disposed between and electrically isolated from the first and second soft magnetic pole layers the first plurality of conductive sections disposed in a first layer, extending parallel to each other, and each terminating in a conductive portion that is disposed in the first layer and extends transversely to the first plurality of conductive sections; and
(c) the coil includes a second plurality of conductive sections that are disposed between and electrically isolated from the first and second soft magnetic pole layers, the conductive sections disposed in a second layer, extending parallel to each other, and having a different length measured in a direction parallel to the medium-facing surface.

2. The head of claim 1, wherein the conductive section is part of the coil that substantially encircles the second soft magnetic pole layer.

3. The head of claim 2, wherein the conductive section is ferromagnetic.

4. The head of claim 1, wherein the coil substantially encircles the backgap region.

5. The head of claim 1, wherein the coil includes less than seven conductive sections disposed between and electrically isolated from the first and second soft magnetic pole layers.

6. The head of claim 1, wherein the second soft magnetic pole layer has a leading surface and a trailing surface, the trailing surface having a flat area disposed approximately midway between the medium-facing surface and the backgap region, the leading surface having a curved area disposed closest to the flat area.

7. The head of claim 1, wherein the second soft magnetic pole layer has a trailing surface that is disposed distal to the first soft magnetic pole layer, the trailing surface having a plurality of curved sections separated by a flat, polished section.

8. The head of claim 1, wherein the coil includes the first plurality of conductive sections disposed between and electrically isolated from the first and second soft magnetic pole layers, the first plurality of conductive sections are disposed in the first layer, extending parallel to each other, and each terminating in the conductive portion that is disposed in the first layer and extends transversely to the first plurality of conductive sections.

9. The head of claim 1, wherein the coil includes the second plurality of conductive sections disposed between and electrically isolated from the first and second soft magnetic pole layers, the second plurality of conductive sections disposed in the second layer, extending parallel to each other, and having the different length measured in the direction parallel to the medium-facing surface.

10. The head of claim 1, wherein the coil includes a plurality of conductive sections disposed between and electrically isolated from the first and second soft magnetic pole layers, and an inorganic nonmagnetic insulating material is disposed between the conductive sections.

11. The head of claim 1, wherein the second pedestal includes a high magnetic saturation material.

12. The head of claim 1, wherein the soft magnetic pedestal is separated from the first pole layer by less than one hundred nanometers.

13. The head of claim 1, wherein the soft magnetic pedestal is separated from the first pole layer by at least one micron.

14. A magnetic head for writing information on a relatively-moving medium, the head having a leading end, a trailing end and a medium-facing surface, the head comprising:

a first soft magnetic pole layer disposed in the head adjacent to the medium-facing surface and extending substantially perpendicular to the medium-facing surface;

a second soft magnetic pole layer disposed closer than the first soft magnetic pole layer to the trailing end, the second soft magnetic pole layer magnetically coupled to the first soft magnetic pole layer in a backgap region that is removed from the medium-facing surface;

a first soft magnetic pedestal adjoining the first soft magnetic pole layer, the first soft magnetic pedestal including a region that extends less than the first soft magnetic pole layer extends from the medium-facing surface;

a second soft magnetic pedestal adjoining the second soft magnetic pole layer, the second soft magnetic pedestal disposed closer than the second soft magnetic pole layer to the medium-facing surface and extending less than the second soft magnetic pole layer extends from the medium-facing surface, the second soft magnetic pedestal separated from the first pedestal by a nanoscale nonferromagnetic gap, the second soft magnetic pedestal having a thickness of less than four hundred fifty nanometers between the nanoscale nonferromagnetic gap and the second soft magnetic pole layer, the second soft magnetic pedestal and the first soft magnetic pedestal having track widths that are substantially aligned for a distance that is less than nine hundred nanometers;

a conductive section that is disposed between and electrically isolated from the first and second soft magnetic pole layers, the conductive section being part of a coil that substantially encircles the second soft magnetic pole layer; and wherein the magnetic head has at least one set of characteristics selected from a group consisting of the following sets of characteristics:
(a) the conductive section is ferromagnetic;
(b) the coil includes a first plurality of conductive sections that are disposed between and electrically isolated from the first and second soft magnetic pole layers the first plurality of conductive sections disposed in a first layer, extending parallel to each other, and each terminating in a conductive portion that is disposed in the first layer and extends transversely to the first plurality of conductive sections; and
(c) the coil includes a second plurality of conductive sections that are disposed between and electrically isolated from the first and second pole layers, the second plurality of conductive sections disposed in a second layer, extending parallel to each other, and having a different length measured in a direction parallel to the medium-facing surface.

15. The head of claim 14, wherein the conductive section is ferromagnetic.

16. The head of claim 14, wherein the coil includes less than seven conductive sections disposed between and electrically isolated from the first and second soft magnetic pole layers.

17. The head of claim 14, wherein the coil includes the first plurality of conductive sections that are disposed between and electrically isolated from the first and second soft magnetic pole layers, the first plurality of conductive sections disposed in the first layer, extending parallel to each other, and each terminating in the conductive portion that is disposed in the first layer and extends transversely to the first plurality of conductive sections.

18. The head of claim 14, wherein the coil includes the second plurality of conductive sections that are disposed between and electrically isolated from the first and second pole layers, the second plurality of conductive sections disposed in the second layer, extending parallel to each other, and having the different length measured in the direction parallel to the medium-facing surface.

19. The head of claim 14, wherein the conductive section is part of a coil that includes a plurality of conductive sections that are disposed between and electrically isolated from the first and second soft magnetic pole layers, and an inorganic nonmagnetic insulating material is disposed between the conductive sections.

20. A magnetic head for writing information on a relatively-moving medium, the head having a leading end, a trailing end and a medium-facing surface, the head comprising:

a first soft magnetic pole layer disposed in the head adjacent to the medium-facing surface and extending substantially perpendicular to the medium-facing surface; a second soft magnetic pole layer disposed closer than the first soft magnetic pole layer to the trailing end, the second soft magnetic pole layer magnetically coupled to the first soft magnetic pole layer in a backgap region that is removed from the medium-facing surface;

a first soft magnetic pedestal adjoining the first soft magnetic pole layer, the first soft magnetic pedestal including a region that extends less than the first soft magnetic pole layer extends from the medium-facing surface;

a second soft magnetic pedestal adjoining the second soft magnetic pole layer, the second soft magnetic pedestal disposed closer than the second soft magnetic pole layer to the medium-facing surface and extending less than the second soft magnetic pole layer extends from the medium-facing surface, the second soft magnetic pedestal separated from the first pedestal by a nanoscale nonferromagnetic gap the second soft magnetic pedestal having a thickness of less than four hundred fifty nanometers between the nanoscale nonferromagnetic gap and the second soft magnetic pole layer, the second soft magnetic pedestal and the first soft magnetic pedestal having track widths that are substantially aligned for a distance that is less than nine hundred nanometers; and a conductive section that is disposed between and electrically isolated from the first and second soft magnetic pole layers the conductive section being part of a coil that substantially encircles the second pole soft magnetic layer; and wherein the magnetic head has at least one set of characteristics selected from a group consisting of the following sets of characteristics:

(a) the second soft magnetic pole layer has a leading surface and a trailing surface, the trailing surface having a flat area disposed approximately midway between the medium-facing surface and the backgap region, the leading surface having a curved area disposed closest to the flat area;

(b) the second soft magnetic pole layer has a trailing surface that is disposed distal to the first soft magnetic pole layer, the trailing surface having a plurality of curved sections separated by a flat, polished section; and (c) the first and second soft magnetic pedestals include a high magnetic saturation material.

21. The head of claim 20, wherein the second soft magnetic pole layer has the trailing surface that is disposed distal to the first soft magnetic pole layer, the trailing surface having the plurality of curved sections separated by a flat, polished section.

22. The head of claim 20 wherein the first and second soft magnetic pedestals include the high magnetic saturation material.

23. A magnetic head for writing information on a relatively-moving medium, the head having a leading end, a trailing end and a medium-facing surface, the head comprising:

a first soft magnetic pole layer disposed in the head adjacent to the medium-facing surface and terminating adjacent to the medium-facing surface in a return pole tip;

a second soft magnetic pole layer disposed closer than the first soft magnetic pole layer to the trailing end, the second soft magnetic pole layer magnetically coupled to the first soft magnetic pole layer in a backgap region that is removed from the medium-facing surface;

a soft magnetic pedestal adjoining the second soft magnetic pole layer, the soft magnetic pedestal disposed closer than the second soft magnetic pole layer to the medium-facing surface and extending less than the second soft magnetic pole layer extends from the medium-facing surface, the second soft magnetic pedestal terminating adjacent to the medium-facing surface in a write pole tip that is at least two orders of magnitude smaller than the return pole tip, the soft magnetic pedestal having a thickness that is less than two hundred and fifty nanometers between a gap and the second soft magnetic pole layer; and a conductive section that is disposed between and electrically isolated from the first and second soft magnetic pole layers, the conductive section being part of a coil; and wherein the magnetic head has at least one set of characteristics selected from a group consisting of the following sets of characteristics:

(a) the coil substantially encircles the backgap region;

(b) the coil includes a first plurality of conductive sections that are disposed between and electrically isolated from the first and second soft magnetic pole layers, the first plurality of conductive sections disposed in a first layer, extending parallel to each other, and each terminating in a conductive portion that is disposed in the first layer and extends transversely to the first plurality of conductive sections;

(c) the coil includes a second plurality of conductive sections that are disposed between and electrically isolated from the first and second soft magnetic pole layers, the second plurality of conductive sections disposed in a second layer, extending parallel to each other, and having a different length measured in a direction parallel to the medium-facing surface; and (d) the coil includes a third plurality of conductive sections that are disposed between and electrically isolated from the first and second pole soft magnetic layers, and an inorganic nonmagnetic insulating material is disposed between the third plurality of conductive sections.

24. The head of claim 23, wherein the coil substantially encircles the second soft magnetic pole layer.

25. The head of claim 23, wherein the coil substantially encircles the backgap region.

26. The head of claim 23, wherein the coil includes less than seven conductive sections disposed between and electrically isolated from the first and second soft magnetic pole layers.

27. The head of claim 23, wherein the second soft magnetic pole layer has the trailing surface that is disposed distal to the first soft magnetic pole layer, the trailing surface having the plurality of curved sections separated by the flat, polished section.

28. The head of claim 23, wherein the coil includes the first plurality of conductive sections that are disposed between and electrically isolated from the first and second soft magnetic pole layers, the first plurality of conductive sections disposed in the first layer, extending parallel to each other, and each terminating in the conductive portion that is disposed in the first layer and extends transversely to the conductive sections.

29. The head of claim 23, wherein the coil includes the second plurality of conductive sections that are disposed between and electrically isolated from the first and second soft magnetic pole layers, the second plurality of conductive sections disposed in the second layer, extending parallel to each other, and having the different length measured in a direction parallel to the medium-facing surface.

30. The head of claim 23, wherein the coil that includes the third plurality of conductive sections that are disposed between and electrically isolated from the first and second pole soft magnetic layers, and the inorganic nonmagnetic insulating material is disposed between the third plurality of conductive sections.

31. The head of claim 23, wherein the write pole tip is separated from the return pole tip by the gap of at least one micron.

32. A magnetic head for writing information on a relatively-moving medium, the head having a leading end, a trailing end and a medium-facing surface, the head comprising:
a first soft magnetic pole layer disposed in the head adjacent to the medium-facing surface and terminating adjacent to the medium-facing surface in a return pole tip;
a second soft magnetic pole layer disposed closer than the first soft magnetic pole layer to the trailing end, the second soft magnetic pole layer magnetically coupled to the first soft magnetic pole layer in a backgap region that is removed from the medium-facing surface;
a soft magnetic pedestal adjoining the second soft magnetic pole layer, the soft magnetic pedestal disposed closer than the second soft magnetic pole layer to the medium-facing surface and extending less than the second soft magnetic pole layer extends from the medium-facing surface, the second soft magnetic pedestal terminating adjacent to the medium-facing surface in a write pole tip that is at least two orders of magnitude smaller than the return pole tip, the soft magnetic pedestal having a thickness that is less than two hundred and fifty nanometers between a gap and the second soft magnetic pole layer; and
a conductive section that is disposed between and electrically isolated from the first and second soft magnetic pole layers; and
wherein the magnetic head has at least one set of characteristics selected from a group consisting of the following sets of characteristics:
(a) the second soft magnetic pole layer has a leading surface and a trailing surface, the trailing surface having a flat area disposed approximately midway between the medium-facing surface and the backgap region, the leading surface having a curved area disposed closest to the flat area;
(b) the second soft magnetic pole layer has a trailing surface that is disposed distal to the first soft magnetic pole layer, the trailing surface having a plurality of curved sections separated by a flat, polished section; and
(c) the pedestal includes a high magnetic saturation material.

33. The head of claim 32, wherein the pedestal includes the high magnetic saturation material.

34. A magnetic head for writing information on a relatively-moving medium, the head having a leading end, a trailing end and a medium-facing surface, the head comprising:
a first soft magnetic pole layer disposed in the head adjacent to the medium-facing surface and extending substantially perpendicular to the medium-facing surface;
a second soft magnetic pole layer disposed closer than the first soft magnetic pole layer to the trailing end, the second soft magnetic pole layer magnetically coupled to the first soft magnetic pole layer in a backgap region that is removed from the medium-facing surface;
a first soft magnetic pedestal adjoining the first soft magnetic pole layer, the first soft magnetic pedestal including a region that extends less than the first soft magnetic pole layer extends from the medium-facing surface;
a second soft magnetic pedestal adjoining the second soft magnetic pole layer, the second soft magnetic pedestal disposed closer than the second soft magnetic pole layer to the medium-facing surface and extending less than the second soft magnetic pole layer extends from the medium-facing surface, the second soft magnetic pedestal separated from the first soft magnetic pedestal by a nanoscale nonferromagnetic gap, the second soft magnetic pedestal and the first soft magnetic pedestal having track widths that are substantially aligned for a distance that is less than nine hundred nanometers; and
a conductive section that is disposed between and electrically isolated from the first and second soft magnetic pole layers;
wherein the conductive section is part of a coil that substantially encircles the second soft magnetic pole layer; and
wherein the second pole layer has a leading surface and a trailing surface, the trailing surface having a flat area disposed approximately midway between the medium-facing surface and the backgap region, the leading surface having a curved area disposed closest to the flat area.

35. A magnetic head for writing information on a relatively-moving medium, the head having a leading end, a trailing end and a medium-facing surface, the head comprising:
a first soft magnetic pole layer disposed in the head adjacent to the medium-facing surface and extending substantially perpendicular to the medium-facing surface;
a second soft magnetic pole layer disposed closer than the first soft magnetic pole layer to the trailing end, the second soft magnetic pole layer magnetically coupled to the first soft magnetic pole layer in a backgap region that is removed from the medium-facing surface;
a first soft magnetic pedestal adjoining the first soft magnetic pole layer, the first soft magnetic pedestal including a region that extends less than the first soft magnetic pole layer extends from the medium-facing surface;
a second soft magnetic pedestal adjoining the second soft magnetic pole layer, the second soft magnetic pedestal disposed closer than the second soft magnetic pole layer to the medium-facing surface and extending less than the second soft magnetic pole layer extends from the medium-facing surface, the second soft magnetic pedestal separated from the first soft magnetic pedestal by a nanoscale nonferromagnetic gap, the second soft magnetic pedestal and the first soft magnetic pedestal having track widths that are substantially aligned for a distance that is less than nine hundred nanometers;
a conductive section that is disposed between and electrically isolated from the first and second soft magnetic pole layers;
wherein the conductive section is part of a coil that substantially encircles the second soft magnetic pole layer; and
wherein the second pole layer has a trailing surface that is disposed distal to the first pole layer, the trailing surface having a plurality of curved sections separated by a flat, polished section.

36. A magnetic head for writing information on a relatively-moving medium, the head having a leading end, a trailing end and a medium-facing surface, the head comprising:
a first soft magnetic pole layer disposed in the head adjacent to the medium-facing surface and extending substantially perpendicular to the medium-facing surface;
a second soft magnetic pole layer disposed closer than the first soft magnetic pole layer to the trailing end, the second soft magnetic pole layer magnetically coupled to the first soft magnetic pole layer in a backgap region that is removed from the medium-facing surface;
a first soft magnetic pedestal adjoining the first soft magnetic pole layer, the first soft magnetic pedestal including a region that extends less than the first soft magnetic pole layer extends from the medium-facing surface;
a second soft magnetic pedestal adjoining the second soft magnetic pole layer, the second soft magnetic pedestal disposed closer than the second soft magnetic pole layer to the medium-facing surface and extending less than the second soft magnetic pole layer extends from the medium-facing surface, the second soft magnetic pedestal separated from the first soft magnetic pedestal by a nanoscale nonferromagnetic gap, the second soft magnetic pedestal and the first soft magnetic pedestal having track widths that are substantially aligned for a distance that is less than nine hundred nanometers;
a conductive section that is disposed between and electrically isolated from the first and second soft magnetic pole layers;
wherein the conductive section is part of a coil that substantially encircles the second soft magnetic pole layer; and
wherein the conductive section is part of a coil that includes a plurality of conductive sections that are disposed between and electrically isolated from the first and second pole layers, the conductive sections disposed in a layer, extending parallel to each other, and each terminating in a conductive portion that is disposed in the layer and extends transversely to the conductive sections.

37. A magnetic head for writing information on a relatively-moving medium, the head having a leading end, a trailing end and a medium-facing surface, the head comprising:
a first soft magnetic pole layer disposed in the head adjacent to the medium-facing surface and extending substantially perpendicular to the medium-facing surface;
a second soft magnetic pole layer disposed closer than the first soft magnetic pole layer to the trailing end, the second soft magnetic pole layer magnetically coupled to the first soft magnetic pole layer in a backgap region that is removed from the medium-facing surface;
a first soft magnetic pedestal adjoining the first soft magnetic pole layer, the first soft magnetic pedestal including a region that extends less than the first soft magnetic pole layer extends from the medium-facing surface;
a second soft magnetic pedestal adjoining the second soft magnetic pole layer, the second soft magnetic pedestal disposed closer than the second soft magnetic pole layer to the medium-facing surface and extending less than the second soft magnetic pole layer extends from the medium-facing surface, the second soft magnetic pedestal separated from the first soft magnetic pedestal by a nanoscale nonferromagnetic gap, the second soft magnetic pedestal and the first soft magnetic pedestal having track widths that are substantially aligned for a distance that is less than nine hundred nanometers;
a conductive section that is disposed between and electrically isolated from the first and second soft magnetic pole layers;
wherein the conductive section is part of a coil that substantially encircles the second soft magnetic pole layer; and
wherein the conductive section is part of a coil that includes a plurality of conductive sections that are disposed between and electrically isolated from the first and second pole layers, the conductive sections disposed in a layer, extending parallel to each other, and having a different length measured in a direction parallel to the medium-facing surface.

38. A magnetic head for writing information on a relatively-moving medium, the head having a leading end, a trailing end and a medium-facing surface, the head comprising:

a first soft magnetic pole layer disposed in the head adjacent to the medium-facing surface and extending substantially perpendicular to the medium-facing surface;

a second soft magnetic pole layer disposed closer than the first soft magnetic pole layer to the trailing end, the second soft magnetic pole layer magnetically coupled to the first soft magnetic pole layer in a backgap region that is removed from the medium-facing surface;

a first soft magnetic pedestal adjoining the first soft magnetic pole layer, the first soft magnetic pedestal including a region that extends less than the first soft magnetic pole layer extends from the medium-facing surface;

a second soft magnetic pedestal adjoining the second soft magnetic pole layer, the second soft magnetic pedestal disposed closer than the second soft magnetic pole layer to the medium-facing surface and extending less than the second soft magnetic pole layer extends from the medium-facing surface, the second soft magnetic pedestal separated from the first soft magnetic pedestal by a nanoscale nonferromagnetic gap, the second soft magnetic pedestal and the first soft magnetic pedestal having track widths that are substantially aligned for a distance that is less than nine hundred nanometers;

a conductive section that is disposed between and electrically isolated from the first and second soft magnetic pole layers;

wherein the conductive section is part of a coil that substantially encircles the second soft magnetic pole layer; and wherein the first and second pedestals include a high magnetic saturation material.

\* \* \* \* \*